April 25, 1939. K. L. WOODMAN 2,156,214
RACK FOR RECTANGULAR ROASTERS
Filed Sept. 23, 1936 2 Sheets-Sheet 1
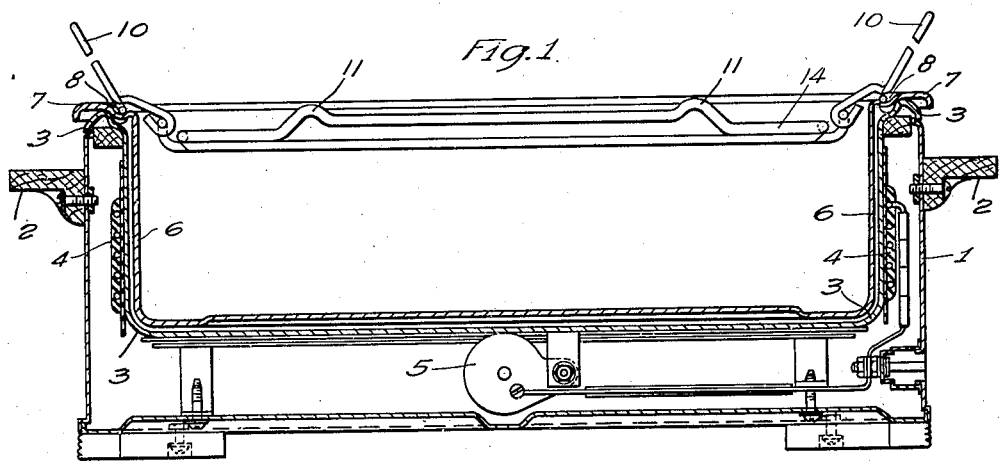
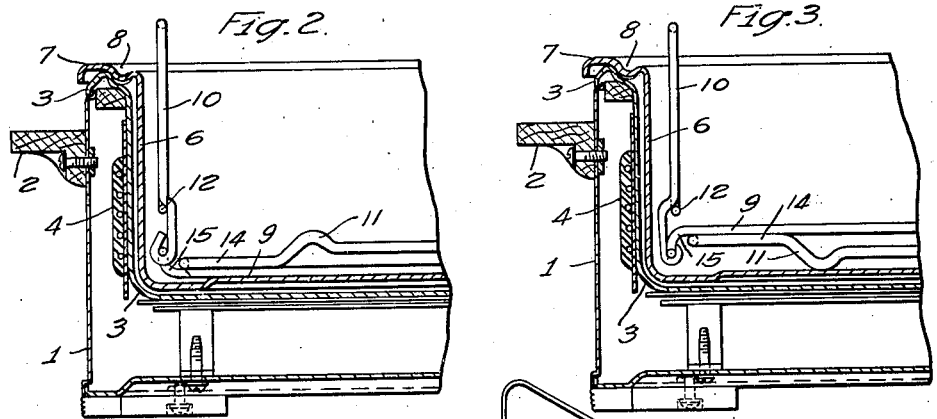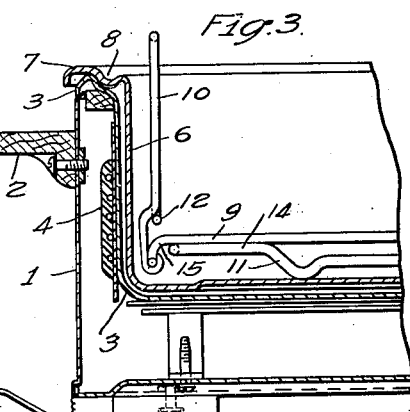
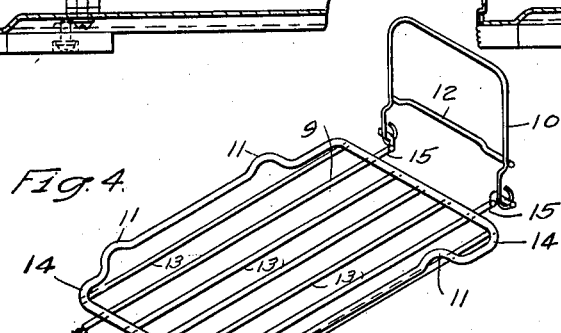
WITNESSES:
INVENTOR
Kenneth L. Woodman.
BY
W R Coley
ATTORNEY April 25, 1939.    K. L. WOODMAN    2,156,214
RACK FOR RECTANGULAR ROASTERS
Filed Sept. 23, 1936    2 Sheets—Sheet 2
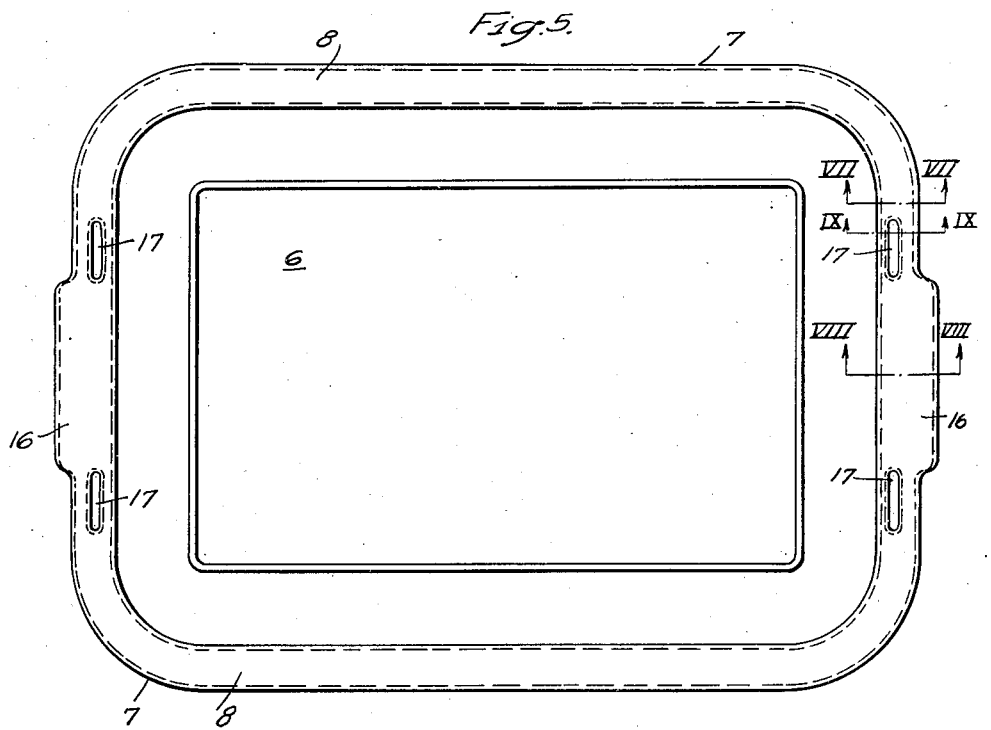
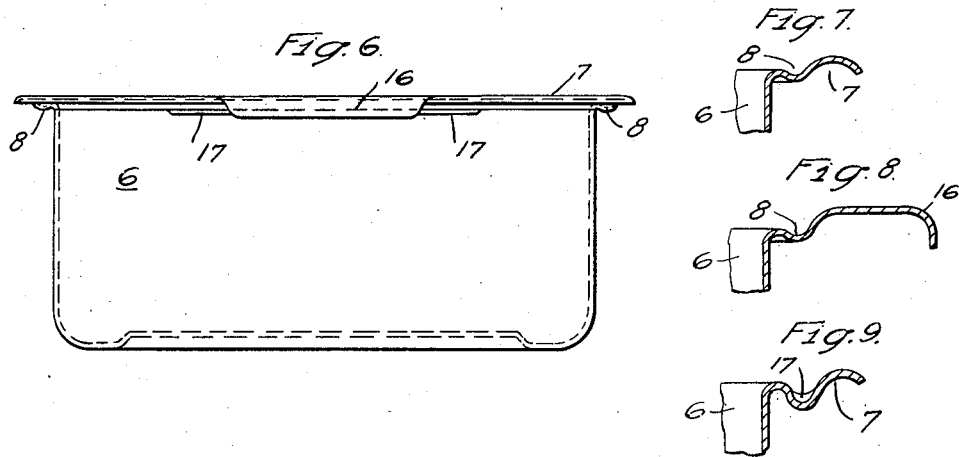
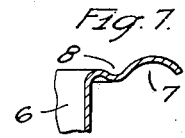
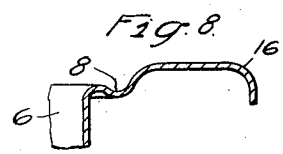
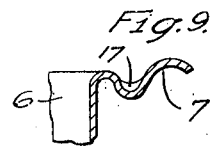
WITNESSES:
INVENTOR
Kenneth L. Woodman.
BY
W. R. Coley
ATTORNEY Patented Apr. 25, 1939

2,156,214

UNITED STATES PATENT OFFICE 2,156,214

RACK FOR RECTANGULAR ROASTERS

Kenneth L. Woodman, Mansfield, Ohio, assignor to Westinghouse Electric & Manufacturing Company, East Pittsburgh, Pa., a corporation of Pennsylvania Application September 23, 1936, Serial No. 102,076

13 Claims. (Cl. 53—6)

My invention relates to cooking devices and more particularly to a removable rack to be used within an electrically heated roaster or the like.

It is an object of my invention to provide a simple, convenient, inexpensive removable rack, which will be sturdy and not easily injured.

In roasters known to the prior art it has been practically impossible to bake, due to the absence of a means of changing the distance between the cooking utensils and the bottom of the roaster. This is very desirable in baking as it is necessary to have an even heat distribution all around and under the cooking utensil. It is, therefore, a further object of my invention to provide a rack with handles or bails which are movable in such a manner that they may be used in either of two positions, one of which permits the rack to be displaced a predetermined distance from the bottom of the roaster.

Other objects of my invention will become evident from the following description taken in conjunction with the accompanying drawings, in which:

Figure 1 is a side sectional view showing the rack being supported in its upper hot-dish-handling or fat-dripping position.

Fig. 2 is a fragment of a side sectional view showing the rack in one of its lower (roasting) positions.

Fig. 3 is a fragment of a side sectional view showing the rack in a position slightly above the bottom of the roaster (for baking purposes).

Fig. 4 is a perspective view of the rack showing the bails as they would appear with the rack in either of its two positions.

Fig. 5 is a top plan view of the removable cooking chamber or inset.

Fig. 6 is an elevational view taken from the righthand end of Fig. 5.

Fig. 7 is a partial sectional view of the cooking chamber taken on line VII—VII of Fig. 5 showing the vapor seal.

Fig. 8 is a partial sectional view of the cooking chamber taken on line VIII—VIII of Fig. 5 showing the vapor seal and handle, and Fig. 9 is a partial sectional view of the cooking chamber taken on line IX—IX of Fig. 5 showing the additional groove within the vapor seal.

As shown in Fig. 1, the roaster consists of a suitable outer casing 1, having attached thereto suitable handles 2. Within the casing 1 is a pan 3 about which is wound a suitable heating element 4. A heat-responsive device or thermostat 5 of any suitable adjustable type may be provided if desired. Cooking chamber or inset 6 having vertical walls which are turned over at the top to form a crown 7 is inserted into pan 3. A groove or vapor seal 8 is contained within the crown 7 and when the cover (not shown) is placed on the roaster it rests within this groove forming a seal which holds the vapors, given off by the cooking substances, within the roaster.

As shown in Fig. 4, a rack 9 is made up of several transverse members 13, preferably small rods or bars, mechanically associated with a generally rectangular frame 14 which may be made of a slightly heavier material. Frame 14 forms the outermost portion of the rack proper and is so formed that intermediate portions 11 of the side sections thereof extend laterally from the plane of the rack, as shown. These irregular portions 11 extend upwardly a predetermined distance and in such a manner that in one position (roasting) of the rack they act as guard rails and, if the rack be inverted to its relatively reversed position (for baking), they may be used as trivets in supporting the rack far enough from the bottom of the roaster so that there shall be an even distribution of heat about the cooking utensils placed upon the rack.

Again referring to Fig. 4, bails 10 are shown loosely attached to extended portions 15 of certain intermediate rods 13 of the rack in such a manner that they may be swung or pivoted about the bent ends of portions 15, which define an axis substantially in the plane of the rack. These bails have an outward offset a short distance above the hinged portion thereof, and an intermediate bar 12 is mechanically attached at a point immediately above these offsets.

As shown in Fig. 2, the rack 9 is in its normal (roasting) position on the bottom of the cooking chamber 6. The bails 10 are disposed along the vertical end walls of the cooking chamber 6 with the intermediate bar 12 on the outside thereof. The irregular side portions 11 are extending laterally in reference to the plane of said rack in such a manner as to act as guard rails.

Bar 12 has its center portion raised or offset in the manner shown. The ends thereof may then be used as feet, which in the hot-dish-handling or upper position of the rack (Fig. 1) are inserted in the additional grooves or indentations 17, located on either side of handles 16, within the vapor seal 8 (shown in Figs. 5, 6 and 9) and which support the rack and contents in its upper position while resting therein. It will be observed that, if the distance between where the bails hook into the additional grooves and where they are hinged onto the rack is too short, a downward force on the rack tends to pull the feet out of the grooves. However, if the supporting members have the proper length any downward force on the rack tends to seat the hook member more firmly in the grooves.

Upon grasping the bails 10 in their roasting position (Fig. 2), the rack with the cooking utensils, may be lifted to a point where the intermediate bar 12 and the feet thereof, may be slipped over the adjacent portions of the vapor seal 8 and into the additional grooves 17, in which case the portion of each bail above the bars projects upwardly beyond the upper edge of the roaster and, of course, the cooking utensils are then readily accessible. This is a very desirable feature in that it allows the operator to easily take hold of the glass dishes without getting burned and in that it is impossible to provide utensils with adequate handles that would not waste too much available cooking space within the roaster.

When using the roaster for deep fat frying, the rack, when in its cooking position, as shown in Fig. 2, is especially adapted to receive the food directly upon its surface. The irregular side portions 11 then prevent the food from sliding off the rack while it is in its upper or draining position.

Upon rotating the bails 10 180° and replacing the rack in its inverted position within the roaster, the irregular side portions 11 of the rack 9 will rest upon the bottom of the cooking chamber 6 (as shown in Fig. 3) and in this position function as trivets in that they support the rack 9 and the vessels placed thereon, a given distance away from the bottom of the cooking chamber 6. In this position the roaster may be ideally used for baking or applications where an even distribution of heat is required completely around the cooking vessel.

It will be seen that I have thus provided a simple and inexpensive, but very convenient rack for safely lifting hot dishes from an electric roaster, or the like, either from a roasting or a baking position, as well as providing a convenient method for lifting hot food out of the roaster while it is being used for deep fat frying with a handy provision for resting the rack with its hot roasting dishes or dripping food at the top of the roaster.

Various modifications may be made in my invention without departing from the spirit and scope thereof and I desire, therefore, that only such limitations shall be placed thereon as are imposed by the prior art or specifically set forth in the following claims.

I claim as my invention:

1. In a cooking appliance including a cooking chamber, a removable rack for use within said cooking chamber, said rack having its side portions extending laterally in reference to the plane of said rack and forming trivets thereon, means comprising swingable bails hinged to the ends of said rack for removing said rack without touching utensils placed thereon, and means for supporting the rack at a position somewhat near the top of said cooking appliance, said means comprising an intermediate bar located upon said hinged bails.

2. In a cooking appliance including a cooking chamber, said cooking chamber having walls with a crown portion at the top thereof having within its surface a cover-receiving groove running around the top of said cooking chamber, a removable rack for use within said cooking chamber said rack having its side portions extending laterally in reference to the plane of said rack and forming trivets thereon, means comprising pivotally mounted bails hinged to the ends of said rack for removing said rack without touching utensils placed thereon, and means comprising an intermediate bar located upon said hinged bails for supporting the rack in said groove.

3. In a cooking appliance including a cooking chamber having substantially vertical walls with a crown portion at the top thereof having within its surface a cover-receiving groove running around the top of said cooking chamber, said groove having a plurality of indentations therein, a removable rack for use within the cooking chamber, said rack having its side portions extending laterally in reference to the plane of said rack and forming trivets thereon, means comprising swingable bails attached to the ends of said rack for removing said rack without touching utensils placed thereon, means comprising an intermediate bar located upon said bails for supporting the rack in said groove with said intermediate bar resting within said indentations.

4. In a cooking appliance including a cooking chamber, having walls with a crown portion at the top thereof having within its surface groove means, a removable rack for use in either of two relatively reversed positions within said cooking chamber, means for removing said rack without touching utensils placed thereon comprising swingable bails attached to the ends of said rack, and means for disposing said rack, when occupying one of said positions, at a greater distance from the bottom of said cooking chamber than when occupying the relatively reversed position, and means for supporting the rack within said groove means.

5. In a cooking appliance including a removable cooking chamber, a removable rack for use in either of two relatively reversed positions within said cooking chamber, said rack having its side portions extending laterally in reference to the plane of said rack and forming trivets thereon, means for removing said rack without touching utensils placed thereon comprising swingable bails hinged to the ends of said rack, means comprising said trivets for disposing said rack, when occupying one of said positions, at a substantial distance from the bottom of said cooking chamber, and means for supporting the rack at a position somewhat near the top of said cooking appliance, said means comprising an intermediate bar located upon said hinged bails.

6. In a cooking appliance including a cooking chamber having walls with a crown portion at the top thereof having within its surface an endless groove, said groove having a plurality of indentations therein, a removable rack for use in either of two positions within said cooking chamber, said rack having its side portions extending laterally in reference to the plane of said rack and forming trivets thereon, means for removing said rack without touching utensils placed thereon comprising swingable bails attached to the ends of said rack, means comprising said trivets for disposing said rack, when occupying one of said positions, at a substantial distance from the bottom of said cooking chamber, and means comprising an intermediate bar located upon said bails for supporting the rack in said groove with said intermediate bar resting within said indentations.

7. A rack including a frame and a plurality of transverse members attached thereto, said frame having portions thereof extending laterally in reference to the plane of said rack and forming trivets thereon, means for lifting said rack comprising swingable bails hinged to the ends thereof, certain intermediate transverse members having extended portions with the ends thereof bent so as to form hinges about which said bails are swingable, said bails having an outward offset a short distance above the hinged portions thereof and an intermediate bar attached at a point immediately above these offsets, said rack having a reversible base member to permit using the rack in either of two positions, and said trivets constituting supporting members for said rack when occupying one of said positions.

8. The combination of an open top receptacle having bottom and upstanding walls, said upstanding walls being provided with a crown portion at the top thereof having a groove or grooves formed therein, a removable rack adapted to rest on said bottom wall, bails hinged to the ends of the rack for lifting the same out of the receptacle, and means provided on said bails and adapted to rest in said groove or grooves for supporting said rack in elevated position in said receptacle.

9. A roaster comprising an open top receptacle, an inset pan disposed within said receptacle in closely fitting relation and having a flange at the top overlying the top of the receptacle, said flange having depressions therein at the ends of the pan, and a rack adapted to rest on the bottom of the inset pan and having bails hinged to the ends thereof, said bails having means provided thereon to engage in said depressions for supporting said rack in elevated position in said inset pan.

10. A roaster comprising a pan having a bottom and upstanding side and end walls, a rack adapted to rest on said bottom wall, a bail hinged to each end of the rack and having a horizontal bar attached thereto, the portions of the bail adjacent said bar being formed so as to constitute, together with horizontal portions of the bar, hooks adapted to engage the top of the end wall of the pan for supporting the rack in elevated position.

11. In a cooking appliance including a cooking chamber having walls with a crown portion at the top thereof having within its surface upwardly facing groove means, a removable rack for use within said cooking chamber, means for removing said rack without touching utensils placed thereon, and means for supporting the rack within said groove means against downward movement.

12. A cooking appliance including a cooking chamber having substantially vertical walls formed with a crown portion at the top thereof, said crown portion being formed with a recess on the upper side thereof, a removable rack for use within said cooking chamber, means comprising bails attached to the ends of said rack for removing said rack without touching utensils placed thereon, and means connected to the last-mentioned means and adapted to engage in said recess for supporting the rack therein against downward movement.

13. The combination with an open top receptacle of a rack for use in either of two relatively reversed positions within said chamber and including a frame, a plurality of transverse members attached to the frame, bails hinged to the rack for lifting the same out of the receptacle, portions of said frame of substantial length being displaced laterally of the rack to act as guard rails for retaining articles placed on said transverse members in one of said relatively reversed positions, said transverse members being adapted, in said one position, to rest directly on the bottom of said receptacle for supporting articles thereon for roasting, said transverse members presenting a substantially unobstructed and flat face on the side having the guard rails, and said laterally displaced portions of the frame being adapted, in the relatively reversed position of the rack, to support the transverse members at such a height above the bottom of the said receptacle as is suitable for baking articles placed on said transverse members.

KENNETH L. WOODMAN.